Patented Sept. 21, 1943

2,329,852

UNITED STATES PATENT OFFICE 2,329,852

ADHESIVE COMPOSITION

Herbert J. Reid, Fairlawn, N. J., assignor to United States Rubber Company, New York, N. Y., a corporation of New Jersey No Drawing. Application November 26, 1938, Serial No. 242,555

11 Claims. (Cl. 154—2)

This invention relates to improvements in adhesive compositions, and particularly in rubber-to-metal adhesives.

An object of the invention is to provide an adhesive having the ability to adhere surfaces, particularly rubber surfaces, to other surfaces at atmospheric temperature, i. e. without requiring a heat cure. A further object is to provide an adhesive having the ability to adhere previously vulcanized rubber surfaces to other surfaces at either atmospheric or elevated temperatures. Other objects will be apparent from the following description.

It has been found that the above objects can be attained if there is added to a rubber isomer adhesive a non-sulphur chemical which possesses the properties both of an oxidizing agent and of a vulcanizing agent for ordinary caoutchouc rubbers. For the purposes of this invention the expression—rubber isomer—is meant to refer to any of the well-known thermoplastic rubber isomers, having less chemical unsaturation than rubber and being capable of acting as adhesives between rubber and other surfaces, particularly metal surfaces, included among such known materials being Newbrough rubber (that is, the product obtained by mixing with rubber a sulphuric acid-containing resinous material resulting from the admixture of concentrated sulphuric acid with turpentine and heating according to U. S. Patent No. 100,435), and rubber which has been isomerized by treatment with sulfuric or sulfonic acids, and their sulfurized derivatives obtained by heating the isomers in solution in the presence of added sulfur. Such isomers and sulfurized isomers are known to require the application of heat at elevated temperatures, such as 250° F. and up, in order to develop strong adhesion to the surfaces to which they are applied.

Among such non-sulfur vulcanizing agents are the quinone imines (U. S. P. 2,170,491), halogenated quinones (U. S. P. 1,918,328), polynitroaryl compounds (U. S. P. 1,249,180; U. S. P. 1,291,828), and aromatic acyl peroxides (U. S. P. 1,249,181). In some cases it is to advantage to include therewith in the adhesive compositions an inorganic oxidizing agent, such as lead chromate, lead dioxide, mercuric oxide, etc., which cooperates with the organic vulcanizing agent to effect better vulcanization, and the proportions of which may be as high as 50 parts per 100 parts, by weight, of rubber isomer. It has also been found advantageous to add hexamethylene tetramine to the composition containing the rubber isomer and a non-sulfur vulcanizing agent, the effectiveness of the latter being enhanced thereby, particularly when halogenated quinones are used.

Preferred compositions contain the following constituents (by weight):

| | Parts |
|---|---|
| Rubber isomer* | 100 |
| Tetrachloroquinone | 8 |
| Hexamethylenetetramine | 4 |
| Solvent (e. g. solvent naphtha) to make a 20–30% solution. | |

(*Newbrough rubber isomer, or the same sulfurized as by heating the solution of Newbrough rubber containing about 3% of added sulfur for four hours at about 140° C.)

These proportions may be varied widely but best results are obtained when the oxidizing-vulcanizing agent is used in amounts somewhat greater than those normally required for the non-sulfur vulcanization of ordinary rubber by these materials,—usually from one to two times such amount. The vulcanizing ingredients may be added dry to the solution of rubber isomer, or they may be first dissolved or made into a paste and then added.

Since the oxidizing-vulcanizing agents are highly reactive, it is necessary to keep them separate from the solution of rubber isomer until just prior to use. When all constituents are mixed together, the resulting cement will usually gell and be rendered useless upon standing from 12 to 24 hours, hence it is advisable to use the adhesive shortly after mixing.

The present adhesive compositions may be used in the conventional manner, e. g. the surfaces are first freed from dirt and grease, and then the adhesive is brushed, sprayed or dipped onto one or both surfaces which are to be adhered, and allowed to dry until the solvent has substantially evaporated. The two surfaces, which may or may not be freshened with gasoline or the like, as desired, are then pressed or rolled together, after which it is not necessary to continue the application of pressure. Upon allowing the composite article to stand undisturbed at atmospheric temperatures, maximum adhesion will develop in from 2 to 7 days depending on atmospheric temperature. Although, for most purposes, the adhesives are employed without the application of heat, they also give equally strong adhesion if the assembled article is subjected to heat at elevated temperatures as in the case of adhesives requiring the application of heat. Such procedure is used when it is desired to effect adhesion between a hard rubber stock and another surface during the vulcanization of the hard rubber.

Adhesions up to 300 lbs./sq. inch have been obtained between soft vulcanized rubber and steel by this method, as determined by the A. S. T. M. method for the quantitative evaluation of rubber to metal adhesives. Adhesions of up to 2500 lbs./sq. inch have been obtained between metal and hard rubber vulcanized thereto.

The present adhesive compositions because of their unique properties can be used to great advantage in any case where it is desired to apply rubber to a surface which is of such size or nature that the assembly cannot conveniently be heated above atmospheric temperature to vulcanize the rubber and/or adhesive. An example of this is the rubber covering of structural metals to prevent their corrosion, as in the case of process tanks, etc.

The present adhesive composition will bond cold-curing rubber (rubber which has been compounded with a low temperature vulcanizing combination so as to vulcanize at atmospheric temperatures) to steel, copper, bronze, lead, tin, zinc, aluminum, leather, glass, wood, concrete, vulcanized soft rubber, and vulcanized hard rubber. In addition, my adhesive will bond vulcanized rubber to any of the foregoing materials. Further, it will bond rubber which is compounded to vulcanize in the temperature range from 100-212° F. as well as higher temperatures, to all the structural metals. An additional advantage which my composition possesses is the ability to bond hard rubber securely to steel.

More particular uses are for bonding ordinary hard rubber to propeller shafts, and to steel roll cores, for bonding rubber tank linings which are to be applied in the field, in connection with the application of rubber engravers' blankets to lead backing sheets, etc.

The expression "rubber" where it is used in expressions such as "rubber-to-metal," and "bonding rubber to metal" in the claims, is to be construed broadly as relating to rubber in its variously known solid forms.

While preferred embodiments of the invention have been set forth above, it will be understood that various changes, modifications, and substitutions may be made without departing from the spirit and scope of the invention set forth in the appended claims.

Having thus described my invention, what I claim and desire to protect by Letters Patent is:

1. An improved rubber isomer adhesive composition capable of adhering surfaces at atmospheric temperatures, which composition contains in addition to an adhesive rubber isomer selected from the group consisting of the reaction products of rubber with sulphuric acid, and sulphonic acids; and sulfurized reaction products of rubber with sulphuric acid, and sulfonic acids, a caoutchouc vulcanizing agent selected from the group consisting of quinone-imines, halogenated quinones, polynitroaryl compounds, and aromatic acyl peroxides.

2. An improved rubber isomer adhesive composition capable of adhering surfaces at atmospheric temperatures, which composition contains in addition to an adhesive rubber isomer selected from the group consisting of the reaction products of rubber with sulphuric acid, and sulphonic acids; and sulfurized reaction products of rubber with, sulphuric acid, and sulfonic acids, a caoutchouc vulcanizing agent selected from the group consisting of quinone-imines, halogenated quinones, polynitroaryl compounds, and aromatic acyl peroxides, and an inorganic oxidizing agent containing oxygen and a multi-valent metal.

3. An improved rubber isomer adhesive composition capable of adhering surfaces at atmospheric temperatures, which composition contains in addition to an adhesive rubber isomer selected from the group consisting of the reaction products of rubber with sulphuric acid, and sulphonic acids; and sulfurized reaction products of rubber with sulphuric acid, and sulfonic acids, tetrahaloquinone.

4. An improved rubber isomer adhesive composition which is capable of adhering surfaces at atmospheric temperatures, which adhesive contains in addition to an adhesive rubber isomer selected from the group consisting of the reaction products of rubber with sulphuric acid, and sulphonic acids; and sulfurized reaction products of rubber with sulphuric acid, and sulfonic acids, tetrachloroquinone.

5. An improved rubber isomer adhesive composition capable of adhering surfaces at atmospheric temperatures, which composition contains in addition to an adhesive rubber isomer selected from the group consisting of the reaction products of rubber with sulphuric acid, and sulphonic acids; and sulfurized reaction products of rubber with sulphuric acid, and sulfonic acids, tetrahaloquinone and hexamethylenetetramine.

6. An improved rubber isomer adhesive composition which is capable of adhering surfaces at atmospheric temperatures, which adhesive contains in addition to an adhesive rubber isomer selected from the group consisting of the reaction products of rubber with sulphuric acid, and sulphonic acids; and sulfurized reaction products of rubber with sulphuric acid, and sulfonic acids, tetrachloroquinone and hexamethylenetetramine.

7. A method of bonding a rubber surface to another surface which comprises applying to at least one of the surfaces to be bonded a rubber isomer adhesive composition containing in addition to an adhesive rubber isomer selected from the group consisting of the reaction products of rubber with sulphuric acid, and sulphonic acids; and sulfurized reaction products of rubber with sulphuric acid, and sulfonic acids, a caoutchouc vulcanizing agent selected from the group consisting of quinone-imines, halogenated quinones, polynitroaryl compounds and aromatic acyl peroxides, while the composition is substantially in ungelled condition, and uniting said surfaces by means of said adhesive composition at atmospheric temperatures.

8. A method of bonding rubber to metal which comprises applying to at least one of the surfaces to be bonded a rubber isomer adhesive composition containing in addition to an adhesive rubber isomer selected from the group consisting of the reaction products of rubber with sulphuric acid, and sulphonic acids; and sulfurized reaction products of rubber with sulphuric acid, and sulfonic acids, a caoutchouc vulcanizing agent selected from the group consisting of quinone-imines, halogenated quinones, polynitro-aryl compounds and aromatic acyl peroxides, while the composition is substantially in ungelled condition, and uniting said surfaces by means of said adhesive composition at atmospheric temperatures.

9. A method of bonding a rubber surface to another surface which comprises applying to at least one of the surfaces to be bonded a rubber isomer adhesive composition containing in addition to an adhesive rubber isomer selected from the group consisting of the reaction products of rubber with sulphuric acid, and sulphonic acids; and sulfurized reaction products of rubber with sulphuric acid, and sulfonic acids, a tetrahaloquinone, and hexamethylene tetramine, while the composition is substantially in ungelled condition, and uniting said surfaces by means of said adhesive composition at atmospheric temperatures.

10. A method of bonding rubber to metal which comprises applying to at least one of the surfaces to be bonded a rubber isomer adhesive composition containing in addition to an adhesive rubber isomer selected from the group consisting of the reaction products of rubber with sulphuric acid, and sulphonic acids; and sulfurized reaction products of rubber with sulphuric acid, and sulfonic acids, tetrachloroquinone, while the composition is substantially in ungelled condition, and uniting said surfaces by means of said adhesive composition at atmospheric temperatures.

11. A method of bonding rubber to metal which comprises applying to at least one of the surfaces to be bonded a rubber isomer adhesive composition containing in addition to an adhesive rubber isomer selected from the group consisting of the reaction products of rubber with sulphuric acid, and sulphonic acids; and sulfurized reaction products of rubber with sulphuric acid, and sulfonic acids, tetrachloroquinone, and hexamethylene tetramine, while the composition is substantially in ungelled condition, and uniting said surfaces by means of said adhesive composition at atmospheric temperatures.

HERBERT J. REID.